Figure 1:
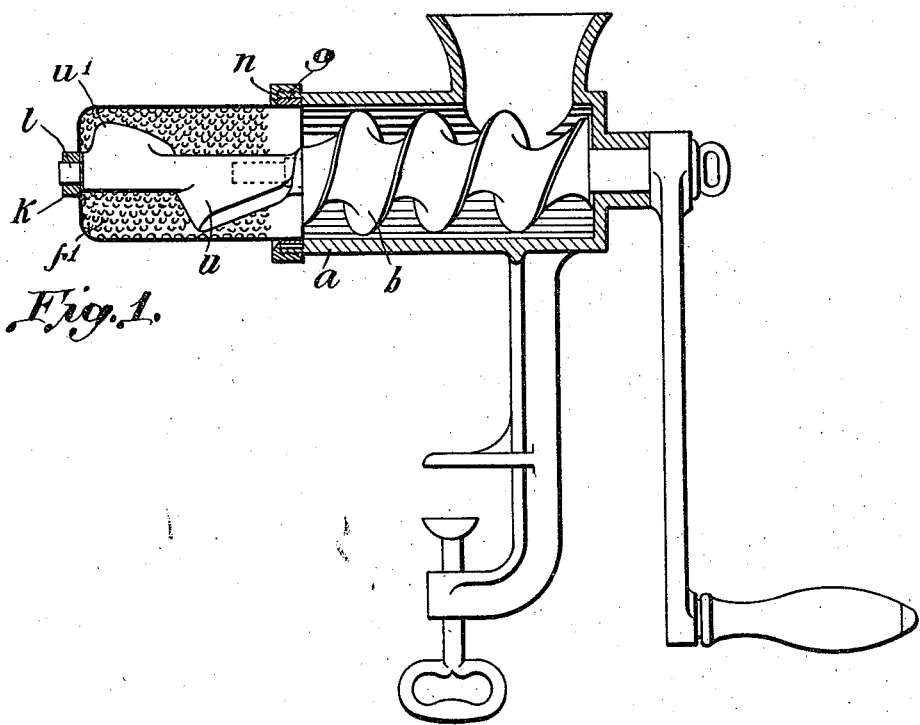

May 26, 1936.    G. SATZINGER    2,042,161
COMMINUTING MACHINE FOR FOODSTUFFS
Filed Jan. 10, 1935    2 Sheets-Sheet 1

Inventor:
Gebhard Satzinger,
By
Atty.

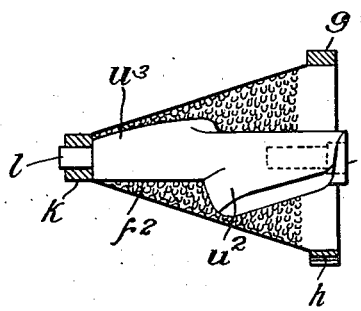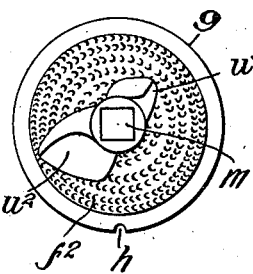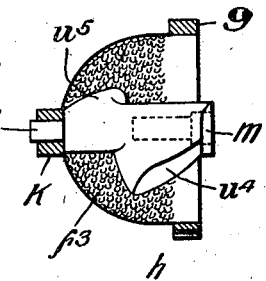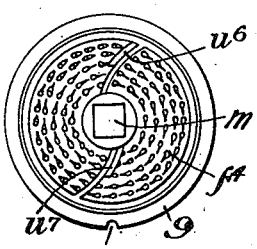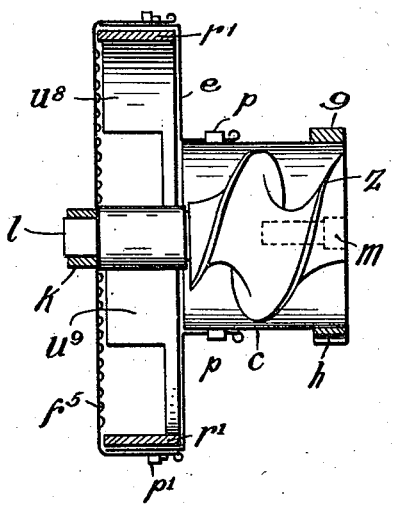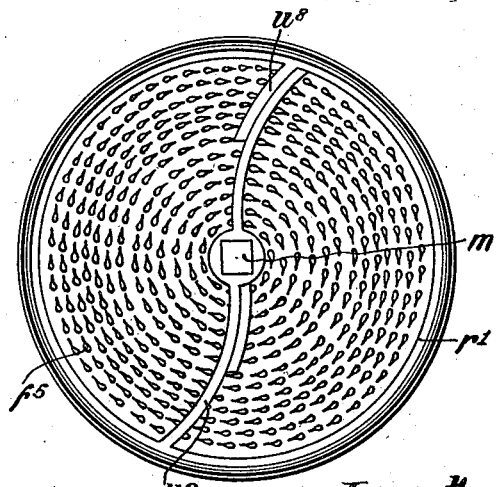

Patented May 26, 1936

2,042,161

UNITED STATES PATENT OFFICE 2,042,161

COMMINUTING MACHINE FOR FOODSTUFFS

Gebhard Satzinger, Bad Kissingen, Germany

Application January 10, 1935, Serial No. 1,179
In Germany May 29, 1934

5 Claims. (Cl. 146—182)

My invention relates to household machines and more particularly to meat chopping machines provided with a helical cutter, which while being rotated cuts up the meat and at the same time by its cutting edges moves the chopped meat along in a tubular casing from which the meat is discharged through a perforated disk detachably secured to the forward end of said tubular casing. Such machines may also be used for chopping up or comminuting other food-stuffs, e. g. raw vegetables, which are subsequently grated. In that case, the perforated disk provided at the forward end of the tubular casing is replaced by a grating device, which by any suitable means is detachably secured to the forward end of the tubular casing referred to and which may have any desired shape. On the forward end of the helical cutter, there is then detachably mounted so as to be rotated therewith a member adapted to cooperate with the grating device to insure the grating of the food-stuff placed in the machine.

In present grating devices of this kind, the food-stuff while being grated will accumulate in lumps and be massed up against the grating surface in such a way, that clogging occurs and the grating effect altogether ceases, while much time is lost in the removal of the accumulated food-stuff, to permit a fresh charge to be grated. This especially occurs with wet or moist food-stuffs, which while being grated leave behind a considerable residue, that is firmly compressed frequently involving damage to the grating device.

Now, the object of the present invention is to eliminate this serious drawback. This I accomplish by the use in cooperation with the grating device of a driving member designed and arranged relative to the grating surface of the grating device as to insure a most favorable and efficient grating effect and entirely prevent grated food-stuff from being caught in lumps between the said driving member and the grating device. To this end I provide a driving member of substantially helical conformation and equipped with two operating parts so disposed that after a portion of the food-stuff has been grated between the said driving member and the grating surface of the grating device, it is sufficiently released, to be moved further along toward the second operating part, whereby it is subjected to another grating action. In this manner, the entire food-stuff is very completely and effectively grated, without any residue being left behind, because the two operating parts of the driving member are so arranged relative to each other that the food-stuff is first grated by one of the two parts and then pushed along thereby without obstruction into the path of the other part, by which the grating action is completed. This arrangement, besides resulting in a completely grated product, has, moreover, the great advantage that much less energy is required for operating the machine than the machines now in use.

The grating device may have any desired shape, it may be like a drum, it may be cone-shaped, semi-spherical, or have any other suitable shape. For large machines, the grating device is preferably shaped like a disk surrounded by a shallow cylindrical casing within which the driving member is rotated. In that case, the operating parts of the driving member are oppositely disposed on either side of the axis of rotation and are substantially S-shaped, being so disposed that each part moves across a definite area of the grating surface. The hollow cylindrical casing is formed with, or has provided thereon, a short tubular extension to be connected to the tubular casing of the meat chopping machine. The helical cutter of the latter is forwardly extended to project into the said tubular extension. In all cases, the driving member adapted to cooperate with the grating device is placed, or mounted, on the forward end of the helical cutter so as to be rotated therewith.

Figures 2, 3, 4:
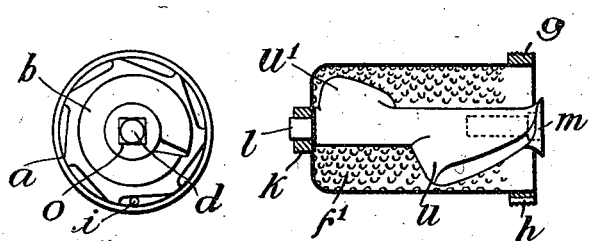

On the appended drawings, on which I have shown for the purpose of illustration several embodiments of my invention, Fig. 1 shows a meat-chopping machine with a grating device provided at the forward end of the tubular casing, the latter and the grating device being shown in longitudinal section; Fig. 2 is an end view of the machine seen from the left in Fig. 1, with the grating device removed; Fig. 3 shows the grating device alone together with the driving member therein, the grating device being shown in longitudinal section as in Fig. 1; Fig. 4 is an end-view of the same as seen from the right in Fig. 3; Figs. 5 and 6 are similar views as Figs. 3 and 4, showing a cone-shaped grating device; Fig. 7 is a similar view as Fig. 3 showing a grating device of semi-spherical shape; Figs. 8 and 9 are respectively a sectional view and an end view showing a disk-shaped grating device; Fig. 10 shows in section a disk-shaped grating device designed for a large meat-chopper and provided with a tubular extension; Fig. 11 is an end view of the disk-shaped grating device as seen from the right in Fig. 10.

In Fig. 1, the tubular casing of the meat-chopping machine is shown at $a$, while the helical cutter enclosed in said casing is shown at $b$. At its forward end, the helical cutter is formed with a square o shown in Fig. 2 and a pivot, or journal, d, the latter being designed to carry the driving member provided with the operating parts u, u'. At f' is shown the grating device formed or provided with a ring, or collar, g, adapted to be engaged by an overlapping nut shown at n, whereby the grating device f' is fastened to the forward end of the tubular casing a. To prevent the grating device from rotation, the ring or collar g thereon is provided with a notch h shown in Fig. 4, into which notch enters a pin i provided on the tubular casing a. At k is shown a bearing provided at the forward end of the grating device, in which bearing is journalled the pivot l provided at the forward end of the driving member u, u', which being secured to the helical cutter b is rotated therewith.

As will be seen from Figs. 1 and 3, the two wing-shaped operating parts u, u' of the driving member are so disposed, that the food-stuff, after having been advanced by the helical cutter b of the meat-chopping machine into the drum-shaped grating device f', is first engaged by the operating part u of the rotating driving member and is forced and pressed by said part u against the inner grating surface of the grating device f'. When the grated food-stuff leaves the operating part u, it is momentarily released, but is immediately thereupon engaged by the second operating part u', whereby it is again forced into contact with the inner grating surface of the grating device being thereby subjected to a further grating action.

The driving member shown in Figs. 5 and 6 is of similar design as the driving member shown in Figs. 1 and 3, the two wing-shaped parts being shown at $u^2$ and $u^3$. The grating device, however, instead of being drum-shaped as shown in Figs. 1 and 3, is cone-shaped, or funnel-shaped, the grating device being shown at $f^2$ in Figs. 5 and 6.

Again in Fig. 7, the driving member comprises two operating wing-shaped parts $u^4$ and $u^5$, arranged in tandem relation and being opposed to each other. In this embodiment, the grating device shown at $f^3$ has semi-spherical shape.

The grating device shown in Figs. 8 and 9 is of disk-shape, while the driving member adapted to cooperate with the grating device comprises two arms radially projecting from a hub m adapted to be fastened to the forward end of the helical cutter b and each carrying a wing-shaped operating part $u^6$ and $u^7$ respectively so disposed that each part moves across a definite area of the inner grating surface of the disk-shaped grating device shown at $f^4$ in Fig. 9. For guiding the driving member, there is provided a ring shown at r in Fig. 8, which ring moves outside of or beyond the grating surface of the grating device $f^4$.

The grating device shown in Figs. 10 and 11, which is designed for large meat chopping machines, is also disk-shaped, and as in Figs. 8 and 9, the driving member cooperating with the grating surface of the grating device shown at $f^5$ comprises two arms radially projecting from a hub m, being diametrically disposed. The two arms each carry a wing-shaped operating part $u^8$ and $u^9$ respectively, each of which moves across a definite area of the grating surface of the grating device. The driving member moves within a shallow cylindrical casing e, to which the grating device $f^5$ is secured by suitable means, such as shown at p' in Fig. 10. At r' in said figure is shown a guide-ring for the driving member adapted to move over the periphery of the grating device $f^5$ outside of its grating surface.

At c is shown a tubular part provided at one end with a collar g, similar to the collar g shown in Figs. 1, 3, 5, 7, and 8, adapted to be engaged by an overlapping nut, whereby the said tubular part c is secured to the forward end of the tubular casing a of the meat-chopper. In this case, the helical cutter b has a forward extension shown at z in Fig. 10, which extension projects into the short tubular part c and receives the hub of the driving member, being for that purpose provided with a pivot pin shown at l in Fig. 10, adapted to be journalled in a bearing provided in the grating device as shown at k in Fig. 10. The shallow cylindrical casing e is provided with a short tubular extension adapted to be fitted onto the forward end of the short tubular part c, on which it is held in place by any suitable means such as shown at p in Fig. 10.

While I have shown several embodiments of my invention, it is self-evident, that other modifications or changes may be made without a departure from the essence or spirit of my invention.

I claim:

1. In combination with the casing of a food comminuting machine and the rotatable food comminuting means contained therein, a grating element detachably mounted on said casing in fixed position beyond the outer end of said food comminuting means, and a plurality of wing-shaped members operatively coupled with said food comminuting means for rotation therewith and disposed to sweep across the inner face of said grating element, said members being angularly spaced about the axis of rotation of said comminuting means and each being of a length so as to cooperate only with a separate definite area of said grating element.

2. In combination with the casing of a food comminuting machine and the rotatable food comminuting means contained therein, a closed cylindrical chamber mounted in fixed position on said casing beyond the outer end of said food comminuting means, said chamber comprising an inner part detachably fastened to the casing and an outer part detachably fastened to said inner part, the outer end of the outer part being comprised by a grating disk, and a plurality of wing-shaped members operatively coupled with said food comminuting means for rotation therewith and disposed to sweep across the inner face of said grating disk, said members being angularly spaced about the axis of rotation of said comminuting means and each being of a length to cooperate only with a definite circular area of said grating disk.

3. In combination with the casing of a food comminuting machine and the rotatable food comminuting means therein, a grating element detachably mounted on said casing in fixed position to receive the food advanced by said food comminuting means, and a member operatively coupled with said food comminuting means for rotation therewith and being provided with wing-shaped projections disposed on opposite sides of the axis of rotation of said member in offset relation to each other so as to cooperate each with only a separate definite area of the inner grating surface of said grating element.

4. In combination with the casing of a food comminuting machine and the rotatable food comminuting means therein, an elongated hollow grating element detachably mounted in fixed position on said casing so as to receive the food advanced by said comminuting means, and wing-shaped members operatively coupled with said food comminuting means for rotation therewith being disposed on opposite sides of the axis of rotation of said comminuting means in advance of each other and of a length so as to each cooperate only with a separate definite zone of the inner grating surface of said grating element.

5. In combination with the casing of a food comminuting machine and the rotatable food comminuting means therein, a hollow grating element detachably mounted in fixed position on said casing so as to receive the food advanced by said comminuting means, and a pair of wing-shaped members within said grating element operatively coupled with said food comminuting means for rotation therewith and disposed on diametrically opposite sides of the axis of rotation of said comminuting means in offset relation to each other so as to cooperate each only with a definite individual area of the inner grating surface of said grating element, said wing-shaped members being angularly disposed relative to said axis of rotation so as to continually advance the food while subjecting it to the grating action of said grating element.

GEBHARD SATZINGER.